US012761195B2

(12) United States Patent
Patel et al.

(10) Patent No.: US 12,761,195 B2
(45) Date of Patent: Oct. 13, 2026

(54) ULTRASONIC INDICATOR DEVICE AND METHOD FOR MONITORING ULTRASONICATION

(71) Applicant: JP Laboratories, Inc., Middlesex, NJ (US)

(72) Inventors: Gordhanbhai N. Patel, Somerset, NJ (US); Julia Koleda Nordenbring, Bloomfield, NJ (US)

(73) Assignee: JP Laboratories, Inc., Middlesex, NJ (US)

( * ) Notice: Subject to any disclaimer, the term of this patent is extended or adjusted under 35 U.S.C. 154(b) by 231 days.

(21) Appl. No.: 18/724,840

(22) PCT Filed: Oct. 25, 2023

(86) PCT No.: PCT/US2023/035854
§ 371 (c)(1),
(2) Date: Jun. 27, 2024

(87) PCT Pub. No.: WO2025/090061
PCT Pub. Date: May 1, 2025

(65) Prior Publication Data
US 2026/0160743 A1 Jun. 11, 2026

(51) Int. Cl.
*G01N 31/22* (2006.01)
*G01N 21/01* (2006.01)
*G01N 21/78* (2006.01)

(52) U.S. Cl.
CPC ............ *G01N 31/22* (2013.01); *G01N 21/01* (2013.01); *G01N 21/78* (2013.01)

(58) Field of Classification Search
CPC ......... G01N 31/22; G01N 21/01; G01N 21/78
See application file for complete search history.

(56) References Cited

U.S. PATENT DOCUMENTS

2006/0145091 A1* 7/2006 Patel .......................... G01T 1/04
250/474.1
2009/0301382 A1* 12/2009 Patel .......................... G01D 3/10
116/201
2016/0303275 A1* 10/2016 Joseph .................... A61F 13/42

FOREIGN PATENT DOCUMENTS

CN 218726674 U * 3/2023

OTHER PUBLICATIONS

English translation of CN-218726674-U.*
Cailean, Daniela, Integrated ultrasonication-ultrafiltration process for the treatment of textile effluents: assessment of operational parameters, 2012, Environmental engineering and management journal, vol. 11 pp. 259-270 (Year: 2012).*

* cited by examiner

*Primary Examiner* — P. Kathryn Wright
*Assistant Examiner* — Alex Ramirez
(74) *Attorney, Agent, or Firm* — Patricia C. Brzostowicz; CR MILES P.C.

(57) ABSTRACT

An ultrasound indicating (USI) device and method for monitoring ultrasonication is provided. The USI device comprises a container comprising a USI formulation. The USI formulation comprises an organic liquid, a pH dye and an activator.

65 Claims, 1 Drawing Sheet

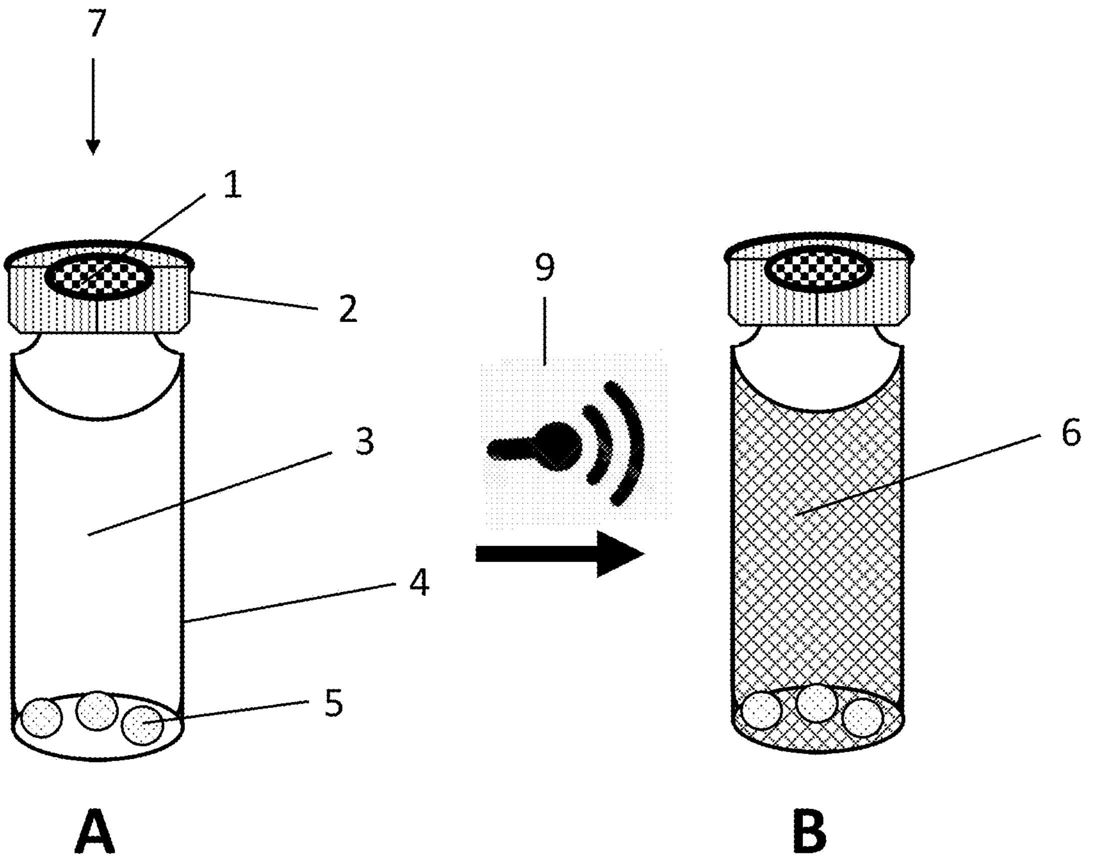
7
1
2
3
4
5
9
6
A
B

ULTRASONIC INDICATOR DEVICE AND METHOD FOR MONITORING ULTRASONICATION

This application is a US national entry application of pending International Patent Appl. No. PCT/US2023/035854 filed Oct. 25, 2023 which is incorporated herein by reference.

FIELD OF THE INVENTION

The present invention is related to an ultrasonic indicator (USI) device which is clear and preferably non-aqueous and which changes colors proportional to the amount of ultrasonic energy imparted thereto. More specifically, the invention is related to an ultrasonic indicator device which can be inserted into a sample being treated with ultrasonic energy wherein the ultrasonic indicator device provides a measurable change in color proportional to the amount of energy imparted in the sample being treated to insure the sample being treated is subjected to a sufficient amount of ultrasonic energy.

BACKGROUND

Ultrasound waves are widely used for cleaning soiled objects and for various other applications. Ultrasonic cleaning, using aqueous fluids, is often used for final cleaning of precision components. Ultrasonic cleaning is advantageous in many applications because it is gentle but very invasive and therefore it is very effective on intricate parts; such as watches, valves, medical instruments, implants, circuit boards, etc. The frequencies used for cleaning typically range from about 20 kHz-200 kHz with frequencies of 40 kHz and 120 kHz typically used to clean machine parts. Other applications include homogenization, emulsification, dispersion, extraction, degassing, and sono-chemical treatments.

Ultrasonic radiation relies on sound waves, which cause acoustic cavitation in the liquid. In acoustic cavitation, bubbles are formed and the bubbles grow until they implosively collapse in the liquid. The collapse of the bubbles is an almost adiabatic process resulting in the massive build-up of energy inside the bubble. The local effect is an extremely high temperature and pressure in a microscopic region of the sonicated liquid. The high temperatures and pressures result in the chemical excitation of any matter within or very near the bubbles as they rapidly implode. These bubbles can have temperatures around 5,000K, pressures of roughly 1,000 atm and heating and cooling rates above 1,010 K/s.

The wide-spread use of ultrasonication has led to the need in the art for a method of testing or monitoring the efficiency of ultrasonic cleaning to ensure an adequate time and energy is imparted on the object while avoiding excessive treatment. There have been many efforts to provide a method, or a system, which can monitor the effect of ultrasonication.

One known method of testing and monitoring the efficiency of ultrasonic cleaning involves the immersion of a thin, conventional aluminum foil into a water basin. Upon ultrasonication small holes are created in the foil by the cavitation bubbles wherein the number of holes in the foil are representative of the length of time used for the cleaning with ultrasonication. The disadvantage of this method is that it does not provide an objective and reproducible test parameter and it is therefore difficult for the user to reliably judge the efficiency of the ultrasonic device.

A device and method that enables testing of the cleaning efficiency of an ultrasonic cleaning device is disclosed in U.S. Pat. No. 7,708,836. The testing device comprises a vessel containing at least one fluid that undergoes a visibly discernable change in color or color intensity upon exposure to collapsing cavitation bubbles produced by the movement of ultrasonic waves generated by the ultrasonic cleaning device. A wall of the vessel is constructed to include at least a portion that is transparent. The vessel further comprises a cavitation promoter comprising glass beads or quartz sand. The vessel may optionally contain a second fluid, which is preferably a gas bubble, which may comprise, for example, atmospheric air or a halogen gas, for example, $Cl_2$, $Br_2$ or $I_2$ gas. A method utilizing the devices might comprise an aqueous sodium chloride solution, and the second fluid might comprise a gas bubble of atmospheric air, whereby the chlorine in the aqueous NaCl solution would ultimately be oxidized. The first fluid might then further comprise an analytical agent capable of analyzing the intensity of the color of the oxidized chlorine. The fluid comprises aqueous red phosphorus or phosphite, a methanol solution, a redox system solution, a halogenide ion solution, a halo-organic compound solution, an oxidative or reductive solution forming or decolorizing a colorant, and a solution polymerizing an organic monomer. The device based on U.S. Pat. No. 7,708,836 is available commercially for example as Sonocheck® from Healthmark Industries Company, Inc., Fraser, MI (USA). The device is based on dehydrohalogenation of halo compounds such as chloroform upon ultrasonication. Halo compounds such as chloroform produce hydrochloric acid (HCl) upon ultrasonication. Production of hydrochloric acid upon ultrasonication is monitored with a pH dye. The material safety data sheet of Sonocheck mentions that it contains water, chloroform (0.1 wt %) and bromothymol blue, a pH dye, 0.1 wt %. According the manual the device requires storing between 4-8° C., to prevent freezing, and the device has a shelf-life of only one year. The major problems with water based ultrasonic indicator are: (i) they cannot be frozen as glass vials may crack due to the expansion of water upon freezing, (ii) the activators, halo compounds such as chloroform have very limited solubility in water and hence higher concentration cannot be used to make the device more sensitive, (iii) only limited number of chlorocompounds can be used because most of chlorocompounds are essentially either immiscible or insoluble in water, (iv) only limited number of dyes which are highly sensitive to pH and undergo an abrupt color change in a very narrow range of pH can be used, (v) pH of the system requires adjustment with an acid or a base to bring the pH of system where the pH dye undergoes a rapid color change upon production of trace amount of hydrochloric acid upon sonication, (vi) as the system operates in very narrow range of pH, it becomes very sensitive and hence has relative shorter shelf-life and (vii) halo compounds are significantly less stable in water than in a non-aqueous media. Hence, there is a need for a non-aqueous ultrasonic indicator which does not have the limitations associated with water based systems.

Wash indicators based primarily on dissolution or dispersion of a dye/pigment from a coating on a substrate are also used for monitoring ultrasonic cleaning. Indicators of this type are available commercially from gke GmbH, Waldems-Esch, Germany; Propper Manufacturing Company, Inc., Long Island City, NY (USA) and Steris, Mentor, OH (USA). These indicators are wash indicators and are not selective to ultrasonic. Examples of such non-ultrasonic wash/cleaning indicators are given in U.S. Pat. Nos. 8,343,437 and 4,129,954; U.S. Published Application No. 20150233848A1; and EP1769808A2.

A PCT application, PCT/US23/34372 entitled "Ultrasonic Indicator Based On Emulsion Formation" filed on Oct. 3, 2023, discloses a device for monitoring ultrasonic energy applied to an object. The device comprises a container comprising water and at least one composition selected from the group consisting of a water insoluble organic liquid as an emulsion aid and an oil forming an emulsion upon ultrasonication. However, this device is substantially an aqueous device.

In spite of the ongoing activities related to ultrasonic indicators there is a need for an improved indicator which is easily read without interference from turbidity, and which can be made in a non-aqueous environment. The present invention provides such an indicator.

SUMMARY OF THE INVENTION

It is an object of the instant invention to provide ultrasonic indicating device comprising and ultrasonic indication formulation which is a color changing chemical indicator for monitoring ultrasonic cleaning wherein the medium of the indicating device is mainly composed of an organic liquid thereby providing a primarily non-aqueous device.

Yet another object of the instant invention is to provide a color changing USI formulation for monitoring ultrasonic cleaning composed of a non-aqueous liquid, an indicator and activator and optionally an accelerator to increase the rate of the color change.

Yet another object of the instant invention is to provide a color changing USI indicator composed of a non-aqueous system preferably comprising a solvent such as diethyl phthalate; an indicator such as a pH dye, especially a leuco dye such as leuco crystal violet; an activator such as halo compound such as chloroform or a nitro compound such as 1,8-dinitronaphthalene or 2,3-dinitronaphalene and optionally an accelerator such as glycerol to increase the rate of the color change.

Yet another object of the instant invention is to provide a cavitation promotor or an agitation aid to accelerate the color development of the non-aqueous USI formulation Yet another object of the instant invention is to provide a confinement system such as a hook or a ring to restrict the movement of the ultrasonic indicating device.

Yet another object of the instant invention is to provide a closed or sealed, glass or plastic clear container including a pouch containing the non-aqueous ultrasonic indicator formulation.

Yet another object of the present invention is to provide non-aqueous ultrasonic indicator device which is machine readable by printing or attaching a readable indicium such as a barcode, quick-response (QR) code or color reference bar on the container of the USI device.

Yet another object of the present invention is to provide a color reference chart on the indicating device for monitoring full or partial doneness of the sonication process.

A particular feature of the instant invention is the ability to provide a USI device, for monitoring ultrasonification, which is clear and lacks turbidity thereby allowing for a system which can be optically monitored for color change without the necessity of special equipment.

Yet another embodiment is to provide a method of making a non-aqueous ultrasonic indicating formulation which changes color upon ultrasonication by dissolving a pH dye and a halo compound in a non-aqueous organic liquid.

Yet another embodiment is to provide a method of monitoring ultrasonic cleaning comprising: placing a non-aqueous USI device comprising a USI formulation in an ultrasonic cleaning device comprising a fluid and an object to be ultrasonically cleaned wherein the USI device comprises a container comprising a non-aqueous USI formulation comprising an organic liquid, an activator, an indicator, and optionally at least one of an agitation aid and accelerator.

These and other advantages, as will be realized, are provided in a USI device comprising a container comprising a USI formulation comprising an organic liquid; a pH dye and an activator.

Yet another embodiment is provided in a process for monitoring ultrasonic energy imparted on a system comprising:

forming a USI device comprising:
a container comprising a USI formulation comprising:
an organic liquid;
a pH dye; and
an activator;
placing the USI device in the system; and
exposing the system to ultrasonic radiation until the USI formulation changes color.

BRIEF DESCRIPTION OF DRAWINGS

FIG. 1 is a schematic representation of a USI device.

DESCRIPTION

The present invention is specific to a USI device comprising a clear, preferably non-aqueous, USI formulation which changes colors proportional to the amount of ultrasonic energy absorbed thereby. More specifically, the present invention is related to a clear, preferably non-aqueous USI formulation comprising a preferably organic liquid, a pH dye and a halo compound preferably in a sealed clear container.

For the purposes of this disclosure a non-aqueous or organic solvent system utilizes a liquid medium comprising at least 60 wt % organic or inorganic liquid or solvent. More specifically, a non-aqueous or organic solvent system comprises less than 40 wt % water, more preferably less than 5 wt % water, even more preferably less than 1 wt % water and most preferably less than 0.5 wt % water.

For the purposes of this disclosure sonication refers to ultrasonication. A sono bath refers to an ultrasonication bath. A chemical indicator refers to an ultrasonic indicator. A sono-indicator refers to an ultrasonic indicator and a sono-formulation refers to an ultrasonic USI formulation.

For the purposes of this disclosure a color change from one color to another color also includes color developments, such as going from colorless or clear to a distinguishable color such as green or color fading such as a decrease in color such as going from green to colorless or a change in opacity.

The term device refers to an USI device.

An accelerator is a composition which can increase the rate of a reaction such as dehydrohalogenation of an activator such as chloroform upon ultrasonication.

An activator is a composition such as halo compound or nitro compound such as chloroform and 2,3-dintrophaphalene which undergoes a chemical reaction such as dehydrohalogenation upon ultrasonication and produces a reactive species such as hydrochloric acid or nitric acid.

A halo compound is a halogenated hydrocarbon which is preferably a halogenated alkyl, alkene, alkyn or aromatic hydrocarbon wherein at least one of the hydrogens of the hydrocarbon is replace with a halogen preferably selected from fluorine, chlorine, bromine and iodine. A nitro compound is an alkyl, alkene, alkyn or aromatic hydrocarbon which is substituted with at least one nitro group.

A controller is a compound which controls reactions by increasing or decreasing the rate of reaction upon ultrasonication. The controller, for example, can be an acid, a base, a salt, a buffer or a viscosity modifier with which the time required for the color change of the indicating system is controlled. A controller is often referred to as an additive.

An indicator is a compound such as a pH dye which reacts with an activator or a reaction product of the activator and undergoes a noticeable or measurable change in color, fluorescence, transparency or conductivity upon ultrasonication.

Shelf life is the storage time of the indicating device during which usefulness of the device is not meaningfully affected.

The invention will be described with reference to the FIGURE which is an integral, but non-limiting, part of the specification provided for clarity of the invention.

An embodiment of the invention will be described with reference to FIG. 1 wherein a USI device, 7 is illustrated schematically. In FIG. 1A a container, 4, contains the USI formulation, 3. The container can be a glass or plastic vial which is preferably transparent clear or colorless fitted with a rubber septum, 1, and aluminum crimp seal cap, 2. Optional agitation aids, 5, are preferably in the container. The USI formulation can undergo a color change upon agitation by ultrasonication, 9, resulting in a sonicated indicating formulation, 6, as indicated in FIG. 1B.

A preferred USI formulation comprises 0.01-50 wt % activator; 10-99 wt % organic liquid and 0.001 to 10 wt % pH dye. A particularly preferred USI formulation comprises 1-5 ml of an organic medium preferably diethyl phthalate, 0.05 g to 0.5 g of a halo compound preferably chloroform and 0.001 to 0.05 g of a pH dye preferably leuco crystal violet in a 2 to 5 ml glass vial with a screw cap and 1-10 1 mm glass beads or a 12 mm marble in a 5 ml glass vial.

Preferred organic liquids, also referred to as the medium, are solvents or organic water-insoluble liquid which can be used as a medium. Particularly preferred organic liquids are selected from the group consisting of substituted or unsubstituted aliphatic or aromatic amides preferably acetamide, dimethylformamide and chloroacetamide; alcohols, preferably amyl alcohol, hexyl alcohol, and dichloropropanol; esters, preferably methylpropionate, amylformate, diethyl maleate, ethylene glycol diacetate, ethylsalicylate, and triacetin; nitroalkanes preferably nitropropane; aldehydes, preferably butyraldehyde; carbonates, preferably diethylcarbonate and propylene carbonate; aromatic alcohols/phenols, preferably dihydroxy benzene, benzyl alcohol and phenol; amines, preferably diethanolamine, dimethylpyridine and cyclohexane diamine; ether-esters preferably ethoxyethylacetate, trioxane, tetraethylene glycol dimethylether, benzyl ether, phenylether, propylene glycol ethylether acetate and propylene glycol butylether; alcohol-esters, preferably ethylene glycol monoacetate; acids, preferably glutaric acid, isobutyric acid, mandelic acid, and toluene sulfonic acid; ketones, preferably methylethylketone, hydroxyacetophenone, ketone-esters, preferably methylacetoacetate; lactones, preferably propiolactone and butyrolactone and methylpyrrolidone or mixture thereof. The media can be a halocarbon liquid such as 1,1,1-trichloroethane. When a halocarbon liquid is used as a medium, the halocarbon may function as the organic liquid and the activator. The media can be a non-oil organic or inorganic liquid.

A particularly preferred medium is an organic liquid selected from the group consisting of benzyl ether, 4-(benzyloxy)phenol, bis (2-ethylhexyl) adipate, bis (2-ethylhexyl) sebacate, cyclopentanone, dibutyl adipate, dibutyl diacetate, diethyl malate, diethyl malonate, diethyl oxalate, diethyl phthalate, diethyl succinate, diethyl l-tartrate, dimethyl carbonate, dimethyl maleate, dimethyl malonate, dimethyl phthalate, dioctyl phthalate, ethylene carbonate, ethylene glycol diacetate, candelilia wax, bees wax, paraffin wax, paraffin wax, benzyl n-butyl phthalate, dibutyl phthalate, triethyl phosphate, triphenyl phosphate, tris (2-butoxy ethanol) phosphate, tris (2-chloroethyl) phosphate, diethyl phthalate, acetonitrile, 1-butoxy-2-propanol, 1,4-dioxane, 1,3-dioxolane, ethanol, 2-ethoxyethanol, glycerin, ethylene glycol mono-butyl ether acetate, isopropanol, methanol, 1-methoxy-2-propanol, nitromethane. Though inorganic liquids can be used, preferred are organic liquids/solvents.

A particularly preferred medium is an oligomeric liquid comprising from 2 to 100 repeating units of a monomer. A particularly preferred oligomeric liquids is selected from the group consisting of paraffin, polyethylene glycol, polypropylene glycol, polybutadiene, polycaprolactone, poly[di (ethylene glycol) phthalate, poly(dimethylsiloxane), polyurethane and their copolymers of repeat unit 2 to 100.

The liquid media for the USI formulation also includes ionic liquids which are liquid at room temperature such as ethylammonium nitrate (melting point 12° C.), and cations such as acetates of 1-ethyl-3-methylimidazolium, 1-alkyl-3-methylimidazolium, 1-ethyl-3-methylimidazolium, 1-butyl-3-methylimidazolium, 1-octyl-3 methylimidazolium, 1-decyl-3-methylimidazolium, 1-dodecyl-3-methyl-docecylimidazolium, 1-butyl-2,3-dimethylimidazolium and 1,3-di(N,N-dimethylaminoethyl)-2-methylimidazolium.

Particularly preferred pH dyes are selected from the group consisting of Acid alizarin violet N, acid blue 89, acid blue 92, acid fuchsin, acridine, alizarin red, alizarin red S, alizarin yellow GG, alizarin yellow R, alkali blue, 9-amino-6-chloro-2-methoxyacridine, 5-aminosalicylic acid, anilinesulfonephthalein, anthranilic acid, aurin, benzaurin, benzopurpurin 4B, brilliant green, brilliant yellow, bromochlorophenol blue, bromochlorophenol blue-sodium salt, bromocresol green, bromocresol green sodium salt, bromocresol purple, bromocresol purple sodium salt, bromophenol blue, bromophenol blue sodium salt, bromophenol red, bromothymol blue, bromothymol blue sodium salt, bromoxylenol blue, calcein, calmagite, carbazol yellow, 5-carboxyfluorescein, 6-carboxyfluorescein, 5-carboxyfluorescein diacetate, 6-carboxyfluorescein diacetate, 5(6)-carboxyfluorescein diacetate succinimidyl ester, 5-carboxynaphthofluorescein, 6-carboxynaphthofluorescein, 5-carboxynaphthofluorescein diacetate, carboxy snafl 1, carboxy snafl 2, carvacrolphthalein, chlorophenol red, chlorophenol red-sodium salt, chrome orange GR, chrysoidin, clayton yellow, Congo red, coumarin, o-cresolbenzein, o-cresolphthalein, o-cresolphthalein complexon, m-cresol purple, m-cresol purple-sodium salt, o-cresol red, o-cresol red-sodium salt, crystal violet, curcumin, dichlorofluorescein, 6,7-dihydroxycoumarin, 3,6-dihydroxyphthalimide, 4-dimethylamino-2-methylazobenzene, dinitrocresol, alpha-dinitrophenol, beta-dinitrophenol, gamma-dinitrophenol, epsilon-dinitrophenol, delta-dinitrophenol, 2,4-dinitrophenylhydrazine, dinitrothymol, direct blue 72, dixylenolphthalein, eosin Y, erythrosin B, esculetin, ethyl-bis(2,4-dinitrophenyl)-acetate, ethyl green, ethyl orange, ethyl red, ethyl violet, fluorescein, fluorescein diacetate, fluorescein disodium salt, fluorescein-5-isothiocyanate, fluorexon, gallein, gentian violet, gentian violet B, guaiacolphthalein, harmine, hematoxylin, 4-heptadecyl-7-hydroxycoumarin, heptamethoxy red, hexamethoxy red, o-hydroxypheylbenzimidazole, o-hydroxypheylbenzothiazole, o-hydroxypheylbenzoxazole, indigo carmine, indophenol, iodophenol blue, isonitrosothiocamphor, isopicramic acid, lacmoid, lanacyl violet BF, luminol, lysosensor blue DND 167, lysosensor blue DND 192, lysosensor green DND 189, lysosensor yellow/blue DND 160, magdala red, malachite green, martius yellow, mesalamine, Metanil yellow, 2-methoxybenzaldehyde, 4-methylesculetin, methyl green, methyl orange, methyl purple, methyl red, methyl red sodium salt, 4-methylumbelliferone, methyl violet, methyl yellow, alpha-naphthoic acid, beta-naphthol, naphthol AS, alpha-naphtholbenzein, alpha-naphtholphthalein, alpha-naphthylamine, beta-naphthylamine, alpha-naphthyl red, neutral red, Nile blue, nitramine, nitrazine yellow, p-nitrobenzhydrazide, p-nitrobenzylcyanide, 4-nitrocatechol, o-nitrophenol, m-nitrophenol, p-nitrophenol, orange II, orange III, orange IV, Oregon green 488 carboxylic acid, Oregon green 514 carboxylic acid, Oregon green 488 carboxylic acid diacetate, patent blue V, pentamethoxy red, phenolbenzein, phenolmalein, phenolphthalein, phenolphthalein disodium salt, phenol red, phenol red sodium salt, 4-(phenylazo)-diphenylamine, o-phenylenediamine, p-phenylenediamine, phloxine B, picric acid, pinachrome, poirrier blue, propyl red, pyrogallolphthalein, quinaldine red, quinine, quininic acid, quinoline blue, resazurin, resorcein, resorcinmalein, resorufin, rhodol green, p-rosolic acid, rubrophen, salicyladehyde semicarbazone, salicylic acid, salicyl yellow, solochrome violet RS, sulphan blue, tetrabromophenol blue, tetrabromophenol blue sodium salt, tetrabromophenolphthalein, tetraiodophenolsulfonephthalein, tetryl, thiazol yellow G, thymolbenzein, thymol blue, thymolphthalein, trinitrobenzene, trinitrobenzoic acid, trinitrotoluene, tropaeolin O, tropaeolin OO, tropaeolin OOO, umbelliferone, xylenol blue, xylenol orange and xylenolphthalein.

Particularly preferred pH dyes are leuco dyes selected from the group consisting of leuco crystal violet, rose Bengal, rose Bengal lactone, methylene violet 3RAX, malachite green carbinol base, xylenol blue, leuco malachite green, pararosaniline base, methyl violet B base, acridine orange base, Leucoquinizarin and leuco fluoran dyes.

Particularly preferred activators are halo compounds and nitro compounds which undergo degradation upon ultrasonication to produce an acid which can be monitored by the pH dye. Particularly preferred activators are halo compounds, especially chloro compounds because halo compounds undergo dehydrohalogenation upon ultrasonication and produce an acid, such as hydrochloric acid, which changes a color of a pH dye. Organic chloro compounds typically are not soluble in water while they are readily soluble in organic solvents/liquid. Liquid organic chloro-compounds such as chloroform are not soluble in water and hence they are prone to phase separate in water. Liquid chloro-compounds are denser/heavier than water and they settle at the bottom of the container/vial when water is used as a medium. The stability of halo compounds is usually poor in aqueous medium and hence require a stabilizer.

Halo compounds are readily soluble in high concentration in organic solvents and hence the device can be very sensitive to ultrasonication but less sensitive to its concentration and concentration of the pH dye. Halo compounds form uniform solution in organic solvents. Use of higher concentration of halo compounds can make devices more sensitive to ultrasonic radiation. There is extremely large number of non-toxic organic liquids that can be used as media that dissolve halo compounds. Even solid chloro compounds such as 1,1,1-trichloroacetamide and polymeric halo compounds, such as polyvinyl chloride and polyvinylidene chloride can be used as activators as they are soluble in organic solvents while they, especially halo polymers are completely insoluble in water. As halo compounds are soluble in organic solvents, it gives wider choice halo compounds that can be used as activators and the medium. Stability of halo carbons is higher in organic solvents than in water.

A compound which is sensitive to ultrasonic radiation and undergoes a chemical change upon ultrasonication is referred to herein as an activator. For example, halo carbon compounds such as chloroform undergo degradation and produce hydrochloric acid upon ultrasonication. Similarly, nitro compounds such as 2,3-dintronaphthalene can undergo degradation and produce nitric acid upon ultrasonication. Thus, halo compounds and nitro compounds are activators. When the acid produced upon the ultrasonication reacts with a pH dye, it changes the color of the pH dye. The pH dye is an indicator. Thus, halo compounds and nitro compounds are particularly preferred activators.

Chloro, bromo, iodo and mix halocarbon compounds such as chloro-bromo, chloro-iodo, can be used as activators. The halocarbon can be mono, di and tri halocarbon. Preferred halocarbon is a trihalocarbon. The most preferred halocarbon is trichlorocarbon compound such as chloroform.

Halo compounds, including inorganic halo compounds, can be used as an activator to produce hydrochloric acid upon ultrasonication. The preferred halocompounds as activators are organic halo-hydrocarbons. Particularly preferred halo compounds that can be used as activators to make color changing USI devices include: 1-chloro-1-nitropropane, chloroform, carbon tetrachloride, chloroacetic acid, chloropropionic acid, ethyl trichloroacetate, heptachloropropane, hexachlorocyclohexane, methyl trichloroacetimidate, pentachloroethane, tetrachloroethane, trichloroethanol, trichloromethyl benzyl acetate, trichloromethyl propanol hydrate, trichloropropane, trichloroacetamide, trichloroacetic acid, trichloroethaneisocyante, trichloromethylbenzylacetate, trichloromethylpropanol, trichloropropane, chlorinated paraffins, halo polymers, such as polyvinyl chloride, polyvinylidene chloride, polyepichlorhydrin and halogenated polymers, such as chlorinated polyisoprene and chlorinated polyvinylchloride. Other halo compounds include, 1,1-bis [p-chlorophenyl]-2,2,2-trichloroethane; 1,1-bis [p-methoxyphenyl]-2,2,2-trichloroethane; 1,2,5,6,9,10-hexabromo cyclododecane; 1,10-dibromodecane; 1,1-bis [p-chlorophenyl]-2,2-dichloroethane: 4,4'-dichloro-2-(trichloromethyl) benzhydrol; hexachlorodimethyl sulfone; 2-chloro-6 (trichloromethyl) pyridine; 0,0-diethyl-0-(3,5,6-trichloro-2-pyridyl) phosphorothionate; 1,2,3,4,5,6-hexachloro cyclohexane; N(1,1-bis [p-chlorophenyl]-2,2,2-trichloroethyl) acetamide; tris [2,3-dibromopropyl]isocyanurate; 2,2-bis [p-chlorophenyl]-1,1-dichloroethylene; tris [trichloromethyl]s-triazine; and their isomers, analogs, homologs. Particularly preferred halocarbons are chloroform, dichloroethane, ethyl trichloroacetate, hexachloroacetone, trichloroaetamide, 1,1,1-trichloroethane, trichloromethylphenyl carbinyl acetate and tris(2-chloroethyl)phosphate.

Polymeric halo compounds are particularly suitable for demonstration of the invention. Particularly preferred polymeric halocarbons are selected from polyvinyl chloride, polyvinylidene chloride, chlorinated rubber and their copolymers.

Nitro compounds produce nitric acid upon ultrasonication. Nitroalkanes and cellulose nitrate are particularly suitable for use as an activator. Particularly preferred nitro compounds for use as activators include substituted and unsubstituted aliphatic, aromatic and cyclic nitro compounds such as nitrophenols, nitrotoluenes, nitronaphthalenes, nitroanisidines, nitrobenzenes, chloronitrobenzenes, amyl nitrite, chloronitropropane, diethylene glycol nitrates, ethylene glycol nitrates, ethyl nitrate, nitroglycerins, nitroso compounds and nitrocellulose. Other nitro compounds that are suitable for use to make USI are, inorganic nitrates; such as sodium and ammonium nitrate; and inorganic nitrite, such as sodium nitrite. Particularly preferred nitro-compounds for demonstration of the invention include 2,2'-azodiisobutyronitrile, 3,5-dinitrobenzoic acid, dinitronaphthalene, 1,8-dinitronaphthalene, 3,5-dinitrobenzoic acid, 2,4-dinitro-1-naphthol, disodium 1-nitroso-2-naphthol-3,6-disulfonate, 4-hydroxy-3-nitroso-1-naphthalene sulfonic Acid, 4-nitrobenzoic acid, 5-nitroguaiacol, 4-nitrophenol, 4-nitrosophenol, sodium salt, 1-nitroso-2-naphthol, 2-nitroso-1-naphthol,4-nitrosophenol, 4-nitrotoluene, ammonium nitrate, sodium nitrate and sodium nitrite.

In an alternate embodiment, the halo compounds or nitro compounds can form a complex with the indicator dye. A complex can undergo a decomplexation or halo compounds and nitro compounds undergo complex formation upon ultrasonication. The complex formation is not limited to halo compounds or nitro compounds.

All ingredients of the ultrasonic indicator formulation, e.g., an activator such as chloroform, an indicator such as leuco crystal violet and a medium such as diethyl phthalate form a homogeneous solution and hence the indicating device can be easily made by a single injection of the formulation in a container such as a vial or ampule to make the device. Preferred is a homogeneous formulation but a formulation with ingredients insoluble, partially soluble or suspended in a liquid medium can also be used.

A USI device preferably comprises a closed glass or plastic transparent or translucent container which can contain a USI formulation. The preferred shape of the container is cylindrical but other shaped containers can be used. The size of the container can vary from 0.2 ml, such as a capillary, to about 25 ml with a particularly preferred size being 1-5 ml. The dimensions of the container can be from 0.2 cm to 10 cm long and 0.2 to 5 cm in diameter. After filling the container with an USI formulation, and optionally an agitation aid such as a few glass beads, it must be tightly sealed to prevent leaking of the liquids. The mouth of the container can be closed with a rubber septum and crimp sealed with an aluminum cap or with a self-locking plastic screw cap. The container can be heat sealed instead of sealed by a cap. The container can have a white coating in the back, a color label, a label with a barcode and/or a color reference chart. The USI device can utilize a sealed glass or plastic ampule with the USI formulation inside the ampule.

USI devices when placed in a sonication bath, typically sink to the bottom of the bath or at the bottom of the basket in the bath and move during ultrasonication. Their movement preferably needs to be confined during sonication to avoid falling down, or collisions with the walls of the bath for the object being cleaned. In a preferred embodiment a confinement device, such as a metal ring, in which a USI device is placed, confines the movement during ultrasonication to a limited space. Depending upon the shape of the vial and nature of the bottom surface of the bath, a USI device can spin/rotate and wobble. It is observed that movement and spinning of USI device aids the color development. The USI device changes/develops color faster and color is more uniform if they are allowed move and spin freely in a confined area compared to those whose movement is restricted. The confinement USI device can be of any shape such as square and circle/ring and composed of materials such as metal, plastic, wood, and glass. The thickness, material and shape of the confinement device can affect the color change. The preferred shape of the confinement device is a ring. Prefer material for the confinement device is a metal such as stainless steel. Preferred size/diameter of the confinement device is 1.1 to 3 times larger than that of the USI device. Preferred thickness/diameter of metal is 0.5 mm to 5 mm.

The plastic container can be made of polyethylene, propylene, polystyrene, polyacrylics such as polymethylmethacrylate, polyester, nylon, polyvinyl such as polyvinyl chloride and their copolymer. The glass container can be made of glass such as borosilicate or Pyrex®.

The container can be made spin or wobble if it has a convex bottom or resting on a convex base.

Reaction and color change occurs at the bottom of the container or near the surface of the agitation aids. Instead of a flat bottom round or slightly round bottom vials are preferred. For a given formulation a vial without beads takes many times more for the color development than that containing a right agitation aid such as glass beads. Larger glass beads move/vibrate better and hence are more effective even in horizonal position. Twisted brads, one up and one down are more effective and can be used. Two twisted brads, facing each other are more effective even in horizonal position and can be used. A metal wires or thin rods can be used. Properly shaped metal spring are very effective agitation aids.

In order to eliminate a human error, it is still further preferred to make USI devices machine readable, such as having a readable barcode. Conventional barcode readers monitor only blue, green and black barcodes. The device can be made barcode readable if it changes from a light color such as colorless, yellow or red, to blue, green or black, or vice versa. It is preferable to make barcode readable USI devices, that change from clear/yellow/red-to-blue, green or black, or vice versa. A change in an opacity and color intensity can be more accurately monitored with a barcode reader than by a human.

A USI device with a barcode printed on the container, or a clear adhesive label printed with a barcode applied on the container, is preferable. The USI formulation can be a clear solution before ultrasonication and change to a black, blue, purple, violet and green upon ultrasonication or vice versa. The barcode will be readable when clear and will not be readable when black, blue, purple, violet and green. The barcode can be read with a barcode reader.

The USI devices undergo a series of gradual changes, such as blue→blue-green→green→yellow-green→yellow→red and many shades in-between and vice versa. Alternatively, they change from a color to colorless gradually or from clear to a color gradually. In order to determine if a minimum requirement is met, a color reference chart is preferred wherein the color chart is printed either on the USI device or provided separately so the user can estimate the doneness by matching the color of the sonicated formulation with that of a color reference chart.

A color reference chart/bar printed on the container, or a clear adhesive label printed with a color reference bar applied on the container can also be used. The formulation can be a clear solution before ultrasonication and change to a black, blue, purple, violet and green upon ultrasonication or vice versa. The color of the formulation can be compared/matched with the color reference chart to determine if ultrasonication is complete.

A particularly preferred ultrasonic indicator comprises a mixture of diethyl phthalate, as the nonaqueous organic liquid, leuco crystal violet as the pH dye which functions as the indicator and chloroform as the halo compound which functions as the activator, wherein the mixture is contained in a container such as a glass vial. The mixture changes gradually from colorless to blue-violet upon ultrasonication. By selecting a proper pH dye, a medium, an activator and an additive, a desired color change can be obtained, e.g., use of bromothymol blue in a properly formulated USI device, can undergo a blue/green to yellow/red color change upon sonication.

Turbidity is an optical characteristic and quantification of turbidity is measure of the cloudiness or haziness of a liquid. A liquid with high turbidity has a large number of particles or agglomerations suspended in the liquid wherein the particles or agglomerations are individually not visible to the naked eye. For the purposes of the present invention turbidity is measured in accordance with ISO 7027 "Water Quality: Determination of Turbidity" reported in Formazin Turbidity Units (FTU) with higher numbers representing increased turbidity. Related turbidity measurements utilize different wavelengths of light but report similar results as Nephelometric Turbidity Units (NTU) or Formazin Turbidity Units (RTU) with FTU, NTU and RTU being equivalent and interchangeable. For the purposes of the present invention turbidity reported in any of FTU, NTU or RTU is an equivalent turbidity to the other units. For the purposes of the present invention the USI formulation before or after sonication, has a turbidity of no more than 100 FTU which appears as a clear solution to the naked eye. More preferably the turbidity is no more than 50 FTU and most preferably no more than 20 FTU. A turbidity of over 100 FTU is typically considered an emulsion which is not clear to the naked eye.

A small amount an of inorganic compound in the USI formulation, such as up to 5 wt %, as an adjuvant can facilitate ultrasonication of the USI devices. Particularly preferred inorganic compounds include: ammonium acetate, ammonium bromide, ammonium carbamate, ammonium carbonate, ammonium chloride, ammonium dihydrogen phosphate, ammonium ferrocyanide (II) hydrate, ammonium iron (IIII) citrate, ammonium iron (III) oxylate hydrate, ammonium iron (III) sulfate dodecahydrate, ammonium iron (III) sulfate hexahydrate, ammonium sulfate, ammonium sulfite monohydrate, ammonium thiocyanate, ammonium thiosulfate, alumina, aluminum acetylacetonate, aluminum ammonium sulfate dodecahydrate, aluminum chloride hexahydrate, aluminum hydroxide, aluminum nitrate nonahydrate, aluminum sulfate hexadecahydrate, aluminum sulfate octadecahydrate, benzeneboronic acid, borane-tert-butylamine, borane dimethylamine, boric acid, boric acid tri-n-butyl ester, calcium acetate monohydrate, calcium acetyl acetonate hydrate, calcium bromide anhydrous, calcium bromide monohydrate, calcium chloride, calcium ferrocyanide, calcium hydroxide, calcium orthophosphate, calcium sulfide, copper, copper (II) acetate monohydrate, copper (II) acetylacetonate hydrate, copper (II) bromide, copper (I) chloride, copper (II) chloride hydrate, copper pyrophosphate, copper (II) sulfate pentahydrate, copper (I) thiocyanate, cupric benzoate, lithium acetylacetonate, lithium tetra-borate, lithium chloride, lithium formate monohydrate, lithium hydroxide monohydrate, ferric acetylacetonate, iron (II) bromide, iron (II) chloride tetrahydrate, iron (III) chloride hexahydrate, ferric ferrocyanide, ferrocene, p-gluconic acid, iron (II) salt dihydrate, ferric salicylate, iron (II) sulfate heptahydrate, iron (III) sulfate pentahydrate, magnesium acetate tetrahydrate, magnesium chloride hexahydrate, magnesium oxide, magnesium sulfate heptahydrate, nickel, nickel (IIi) bromide, nickel (II) chloride, nickel sulfate, potassium acetate, potassium benzoate, potassium bromide, potassium carbonate, potassium chloride, potassium ferrocyanide (II) trihydrate, potassium ferricyanide, potassium formate, potassium iodide, potassium nitrate, potassium phosphate, dibasic trihydrate, tripotassium phosphate, potassium pyrophosphate, potassium sodium tartrate tetrahydrate, sodium acetate, sodium acetylacetonate, sodium bromide, sodium carbonate, sodium chloride, sodium cyanate, sodium dihydrogen phosphate, sodium diethyldithiocarbamate trihydrate, sodium fluoroborate, sodium hexametaphosphate, sodium iodide, sodium metasilicate, sodium nitrate, sodium nitrite, sodium oxalate, sodium thiosulfate pentahydrate, sodium phosphate, dibasic, sodium sulfate anhydrous, sodium sulfite anhydrous, sodium tetraborate, sodium thiocyanate, sodium trimetaphosphate, sodium tripolyphosphate, tin (II) bromide, tin (II) 2-ethylhexanoate, zinc acetate dihydrate, zinc acetylacetonate hydrate, zinc bromide, zinc chloride, zinc iodide, zinc sulfate heptahydrate, zinc sulfide and 3-chlorophenylboronic acid.

A small amount of an organic compounds in the USI formulation, such as less than 5 wt %, can be added to facilitate ultrasonication of USI devices. Particularly preferred organic compounds include: 4-acetamidophenol, acetone oxime, 2-amino-p-cresol, 4-tert-amylphenol, ascorbic acid, azodicarbonamide, benzilic acid, 2-(2h-benzotriazol-2-yl)-6-dodecyl-4-methylphenol, benzotriazole, benzenesulfonic acid, benzyl sulfoxide, 2-benzoylbenzoic acid, 4,4-bis (4-hydroxyphenyl)-valeric acid, tert-butylhydroquinone, caffeine, trans-cinnamic acid, 2,6-di-tert-butyl-4-methylphenol, 2,7-dihydroxynaphthalene, 4,5-dihydroxy-2,7-naphthalenedisulfonic acid, 4,5-dihydroxy-2,7-naphthalenedisulfonic acid disodium salt, 6,7-dihydroxy-2-naphthalenesulfonic acid, sodium salt hemihydrate, dimethylglyoxime, diphenylamine, 4-diazodiphenylamine sulfate, diazoaminobenzene, dinitronaphthalene, 1,8-dinitronaphthalene, 2,4-dinitrodiphenylamine, ethylenediaminetetraacetic acid, ethylenediaminetetraacetic acid iron (III) sodium salt hydrate, ethyl gallate, gallic acid monohydrate, gallic acid stearyl ester, gluconic acid, sodium salt 97 wt % (sodium gluconate), δ-gluconolactone, glycerophosphate (calcium salt), 2-hydroxycinnamic acid, 4-hydroxycoumarin, 2-hydroxy-4-methoxybenzophenone7-hydroxy-4-methyl coumarin, 2-hydroxy-1,4-naphthalene, hydroquinonesulfonic acid potassium salt, lauryl gallate, dl-malic acid, mandelic acid, methylhydroquinone, methyl 3,4,5-trihydroxy-benzoate, 5-nitroguaiacol, octadecylamine, 1,10 phenanthroline, phenothiazine, phenylboronic acid, n-phenyl-2-naphthylamine, 4-phenylphenol, phytic acid 50 wt % solution in water, poly (ethylene glycol) dimethyl ether mn~500, propyl gallate, pyrogallic acid, salicylic acid, salicylamide, salicylaldoxime, tetrabutyl ammonium hydrogen sulfate, tetrabutylphosphonium bromide, tannoform, tetra-n-hexylammoinium bromide, tetrahexylammonium bromide, p-toluenesulfonic acid monohydrate, trichloroacetamide, trimethylhydroquinone, 2,3,4-trihydroxybenzophenone, trichloromethylphenyl carbinyl acetate, triethanolamine borate, 2,2',4,4'-tetrahydroxy-benzophenone, tris (hydroxymethyl) aminomethane, 1,1,1-tris(4-hydroxy-phenyl)ethane, resorcinol, rutin hydrate, trans-stilbene, urea, glyoxal trimeric dihydrate, 2-diazo-1-naphthol-5-sulfonic acid sodium salt monohydrate, 1-diazo-2-naphthol-4-sulfonic acid, fast blue base B, fast orange base GC, fast red base B, fast scarlet base G, 4-hydroxy-3-nitrobenzoic acid, 4-nitrocinnamic acid, 2'2-biphenol, citric acid, 1,12-diaminododecane, 4-diazo-3-methoxydiphenylamine sulfate, 4,5-dihydroxy-1,3-benzene disulfonic acid disodium salt hemihydrate, 1,6-dihydroxy naphthalene, 3,6-dihydroxy naphthalene-2,7-disulfonic acid disodium salt, ethylenediaminetetraacetic acid tetrasodium salt dihydrate, magnesium stearate, 4-4'oxydibenzenesulfonyl hydrazide, tetrabutylammonium bromide, 2-acetylphenothiazine, ascorbic acid 6-palmitate and benzamide.

A preferred range of pH of the USI formulation is 4 to 10, more preferably the pH is 5 to 9, even more preferably the pH range is 6 to 8 and the most preferably the pH is 7. The pH of the formulation can be adjusted by adding either a base such as tetrabutylammonium hydroxide and diethanolamine or an acid such as p-toluenesulfonic acid or acetic acid.

Halo compounds such as chloroform and nitro compounds such as 2,3-dintronaphthalene are sensitive to UV light and hence ambient light or sunlight can also introduce a color change in the USI. To prevent or minimize the effect of UV light a UV absorber can be added in the USI formulation or the container can be coated with an UV absorbing ink.

Particularly preferred UV absorbers include benzamide, benzophenone hydrazone, 3,3',4,4' benzophenone tetracarboxylicdianhydride, benzotriazole, 2,2' biphenol, 4,4' biphenol, bisphenol A, 2-(2H-benzotriazole-2-yl-4-methyl phenol), coumarin, ethylhexyl p-methoxycinnamate, 2-ethylhexyl salicylate, oxybenzone, p-aminobenzoic acid its derivatives, diester and/or polyester of a naphthalene dicarboxylic acid, cinnamates (octylmethoxycinnamate and cinoxate), salicylates (methyl salicylate), anthranilates, such as menthyl anthranilate, 2-ethylhexyl-2-cyano-3,3-diphenyl acrylate, 2-phenyl benzimidazole-5-sulfonic acid, digalloyltrioleate, 3-(4-methyl benzylidene) camphor, 4-isopropyl dibenzoyl methane, butyl methoxydibenzoyl methane, 2-ethyl-2-cyano-3,3'-diphenyl acrylate, cupferron, ethylsalicylate, hydroxymethoxy benzophenone, hydroxybenzophenone, hydroxycinnamic acid, sulfosalicylic acid, tetrahydroxy benzophenone, fluorescin, fast blue BB, phenothiazine, 4-nitrophenol, 7-hydroxy-4-methylcoumarin, 2-(2H-Benzotriazol-2-yl)-4-(1,1,3,3-tetramethylbutyl)phenol, 2-(2H-benzotriazol-2-yl)-4,6-di-tert-pentylphenol, poly[2-(4-benzoyl-3-hydroxyphenoxy)ethyl acrylate], 2-tert-butyl-6-(5-chloro-2H-benzotriazol-2-yl)4-methylphenol, 2-(2H-benzotriazol-2-yl)-4,6-bis(1-methyl-1-phenylethyl)phenol, 2,2-methylenebis[6-(2H-benzotriazol-2-yl)-4-(1,1,3,3-tetramethylbutyl)phenol], 2-(2H-benzotriazol-2-yl)-6-dodecyl-4-methylphenol, 2-phenyl-5-benzimidazolesulfonic acid, 2-(2'-hydroxy-5-octylphenyl benzotriazole), 3,4 diaminobenzophenone, 2,4 dihydroxybenzophenone, 3,5 dihydroxy benzoic acid, 2,2' dihydroxy 4,4' dimethyl benzophenone, 2,2' dihydroxy 4 methoxy benzophenone, 23 dihydroxy naphthalene, diphenylamine, di-tert-butyl-4-methyl phenol, 4-hydroxybenzophenone, 2-hydroxy-4-methoxy benzophenone, 2-hydroxy-4n-octyloxybenzophenone, lauryl gallate, phenyl hydroquinone, 4,4'(1,4 phenylenediisopropylidine) bisphenol, 4,4'(1,3 phenylenediisopropylidine) bisphenol, salicylanilide, 2,2',4,4'tetrahydroxy benzophenone, 2,3,4 trihydroxybenzophenone, trimethyl hydroquinone, and 1,1,1tris(4-hydroxyphenyl) ethane. Aromatic polymers, such as polystyrene, polyethylene terephthalate, aromatic polyurethanes and poly(bis-phenol carbonate) are good UV absorbers. The UV absorbing capability can be further increased and broadened by adding proper UV absorbers, such as benzophenones (hydroxy benzophenones), benzotriazoles (hydroxybenzotriazoles), benzoates, oxanilides and salicylates.

Halocarbons decompose upon prolonged storage. To use them as activators, a stabilizer which minimizes or eliminates the thermal decomposition is preferably added in the USI formulation to extend the shelf life of the USI device. Compounds which extend shelf life of a USI formulation, especially the activator or halo compound are referred as stabilizers, which includes epoxides such as polyethylene glycol diglycidyl ether, glycidol, propylene oxide and ethylene oxide; unsaturated compounds such as amylene, ethyl sorbate, ethyl linoleate, and linseed oil; alcohols such as methanol, ethanol, glycerol and glucose; alkyl phenols such as methyl hydroquinone, thymol, menthol, 4-methoxy phenol and dibutyhydroxytoluene (BHT).

The viscosity of the medium can be adjusted with thickeners and viscosity reducers or diluents.

The pH of the USI formulation can be adjusted with an acid, a base, a salt or a buffer or by selecting a proper medium. Some solvents are slightly acidic while other are slightly basic.

Agitation aids added to the USI formulation can function as cavitation promotors which can expedite the reaction of dehydrohalogenation and the color change during ultrasonication. Agitation aids also help in mixing the USI formulation of during sonication. Representative agitation aids include, without limit in material and shape; glass, mineral, metal and plastic objects shaped such as fibers, springs, rods, capillaries, beads/spheres, powder, and pieces. Agitation aids which are particularly suitable for demonstration of the invention include Timeset™ 304 stainless steel woven wire 200 mesh screen; Red Devil™'s 0 fine steel wool pad, 00 very fine steel wool pad, and 000 extra fine steel wool pad; stainless steel scrubbing scouring pad sponge, Sophisti™ clean stainless steel microfiber cloth; crafts black beads; crafts silver beads, Darice™ no hole beads; Pandahall™ beads; zirconium beads; glass beads; alumina beads; q-bead glass 1.2 mm beads; q-bead glass 3 mm beads; washed sand; white quartz powder; German glass glitter; hollow cylinder glass pieces; WGV™ white coarse sand; silica gel 70-230 mesh 60 Angstroms; white quartz sand; Balabead™ glass seed beads beige 0.6 mm; transparent 2 mm and pearlized white 2 mm beads; Czech bugle beads 7 mm; Estes™ gravel products aes06606; marine sand black; Podzly™ white decorative bulk craft sand; glass q-beads 0.8 mm; royal ram natural white marble decorative real sand; rock shed tin oxide polish; and Quackenbush™ zirconium silicate 1.0 mm. Hollow glass beads are particularly suitable for demonstration of the invention.

A container can have one or more agitation aids of the same or different types. Preferred agitation aids are glass beads, glass rods or glass marbles and metal springs.

Accelerators are compounds which when added in a USI formulation increase the reaction and the color change occurs faster. Accelerator can be a pH adjustor. Preferred accelerators are acids. Though strong acids such as mineral acids, can be used, preferred acids are week acids. Particularly preferred acids are selected from carboxylic acids phenols and alkyl alcohols. Particularly preferred acids are selected from the group consisting of hydrochloric acid, hydrobromic acid, hydroiodic acid, sulfuric acid, nitric acid, phosphoric acid and acetic acid.

Particularly preferred thickeners include organic or inorganic, low molecular weight materials having a molecular weight of less than 1000 g/mole. Fumed silica is a suitable thickener. Oligomeric or high molecular weight, typically solvent-soluble, polymers such as polyethylene oxide and polyethylene glycol are suitable thickeners. Addition of a thickener increases the viscosity of the USI formulation.

The time required for the noticeable change, such as a color change can be varied from five seconds to several hours at room temperature by varying the nature and concentrations of the ingredients of the USI formulation.

The device can be used over a very wide temperature range, such as from 10° C. to 70° C.

The concentrations of the ingredients such as a pH dye, halo compound such as chloroform and other additives can be varied from 0.001-50 wt % with the balance being the solvent/medium.

The USI device is particularly suitable for use in monitoring sonication with ultrasonic radiation having a frequency of 20 kHz-200 kHz. The rate of color change increases with increased power/wattage of the ultrasonicating bath.

For a given frequency of the ultrasonic bath, the rate of the color change of the USI formulation will also depend on the power of ultrasonic transducer. A wattage increase of the transducer increases the rate of color change.

It is preferable that the USI formulation does not change color or other changes such as opacity, or form an emulsion, upon normal handling, shaking or vibration during normal handling and transportation/shipment. The USI formulations disclosed herein do not change color upon vigorous shaking of the USI devices.

It is preferable that the USI formulation remains unchanged upon freezing or heating under ambient conditions. The non-aqueous USI formulations disclosed herein are essentially unaffected upon freezing, such as placing the device in a freezer at minus 15° C. for over a day.

About 8% of men and about 0.5% of women are colorblind. Colorblind people see red color differently. Hence, there is a need to develop USI devices which undergo from a very dark color; such as black, blue, green or purple; to light color; such as colorless, yellow, orange or red; or vice versa. One of the objectives is to develop USI devices which undergo a color change from very light color to very dark color such as blue, green and black or vice versa, or from clear to opaque or vice versa.

The USI device can be used in any application wherein ultrasonication is to be monitored. Particularly suitable environments include: medical offices, hospitals, surgical facilities, dental offices, machine shops, jewelers, optometry, avionics, engineering, automotive and printing who often clean the parts by ultrasonication.

The non-aqueous USI formulation can also form an emulsion or color changing emulsion upon ultrasonication by selecting proper ingredients with the proviso that the turbidity does not exceed the limits discussed herein.

A variety of color changes are possible by selecting proper dyes. Color change can be color-A to color-B, colorless-to-color, and color-to-colorless, preferred color changes are red or yellow to green, blue or black, colorless to green, blue or black. In order to introduce more than one color change, a different color dye such as a yellow and red color dye which are insensitive to ultrasonication (referred as nonresponsive dye) can be added in the sonoindicator formulation developing blue color, e.g., leuco crystal violet. Upon sonication, a mix formulation of non-reactive yellow dye and leuco crystal violet will appear to undergo yellow→Yellow/green→Green→green/blue and finally to dark blue and a mix formulation of non-reactive red dye and leuco crystal violet will appear to undergo red→purple/violet→blue→black upon ultrasonication. A dye which fades, changes or develops at different rate upon sonication can also be added to get more than one color change.

The preferred USI formulation comprises 0.01-50 wt % chloro compound and more preferably 0.1-10 wt %; 10-99 wt % medium and more preferably 30-80 wt %; 0.001 to 10 wt % dye and more preferably 0.1-5 wt %; 0.01-50 wt % additive and more preferably 1-10 wt %.

The time required for the color change is preferably 1 second to 30 minutes and more preferably 30 seconds to 5 minutes.

The USI device has a preferred shelf life of at least 1 month to a few years at 25° C. or equivalent time at other temperature. Most preferred shelf life is at least one year at 25° C.

The preferred minimum height of the USI formulation in the vial is 1 cm and more preferably 2 cm with a maximum height of 10 cm, preferably filled to the neck of the container.

All materials/chemicals are preferably non-toxic or of acceptable low toxicity. Easily noticeable color development or color change within 1-2 minutes of sonication. Shelf-life of the USI formulation, with sonication, should be at least one year at room temperature.

The time required for the color change can be varied by varying one or more of the following parameters of the formulation: nature and concentration of indicator/dye, nature and concentration of activator/halo compounds, nature, viscosity and concentration of medium/solvent, nature and concentration of additives such as accelerator, stabilizers, nature and shape of agitation aid and nature and shape of confinement device.

The most preferred USI formulation is substantially or nearly 100% non-aqueous. However, as much as 70 wt % or more water can be added in the formulation if the medium is sufficiently miscible with water to maintain the required turbidity. Organic liquids/solvents such as alcohols such as ethanol, isopropanol, glycerol and ethylene glycol, ethers such as tetrahydrofuran, dioxolane, diethylene glycol monoethyl ether and ethylene glycol dimethyl ether, amides such as formamide, sulfoxide such as dimethyl sulfoxide, ketones such as acetone, and nitriles such as acetonitrile can used as the media with as much as 70 wt % water. For most formulations no more than 20 wt % water will be required to maintain the turbidity.

The non-aqueous USI device and USI formulation offers many advantages. The formulation is easy to make by simply mixing and heating if required to dissolve the dye. The desirable color change, colorless-to-green can be achieved and therefore there is no concern for color blind users. Option of other color changes, e.g., colorless-to-red, blue-to-yellow, yellow-to-blue, green-to-red etc are possible by selecting proper dye. The USI device can be made machine/barcode readable. Plastic and glass containers/vials can be used. Very long shelf life, such as over one year at 25° C. can be achieved especially by selecting proper halo compound and a stabilizer for the halo compound. There is very little effect from ambient light for a month. The effects of sun light can be minimized or eliminated by adding proper amount of a UV absorber. Additives can be added to the USI formulation to control the reaction rate. No toxic materials are used. The system is relatively inexpensive. Freezing has no effect since the USI formulation does not freeze and therefore a glass vial will not break upon freezing. A variety of agitation aids can be used.

Samples of selected USI formulation were placed in the oven at ~45° C. and at room temperature for a varying period up to a month for determination of stability and shelf-life of the formulation. Any color changes were noted. One ml annealed USI formulations were placed in a 2 ml polypropylene centrifuge tube, the cap closed and sonicated. The thermal stability of USI formulations mainly depends upon the nature and concentration of the indicator/dye, medium/solvent, halo compounds and the additive. Addition of an alcohol, such as ethanol, an unsaturated compound, such as amylene, and a base such as solid sodium carbonate or sodium bicarbonate were used for stability studies.

A method of making USI formulation is disclosed in Example 5. A USI device and a method of making it using diethyl phthalate as a medium, chloroform as an activator, leuco crystal violet as a pH dye and glass beads as agitation aids are closed in Examples 6-8. The USI device offers an option of selecting one or more media, indicators and activators. The USI devices were made using media such as 2-butoxyethanol, 2-cyclohexen-1-one, almond oil, avocado, benzyl ether, bis (2-ethylhexyl) adipate, Bis (2-ethylhexyl) sebacate, canola oil, castor oil, corn oil, cottonseed oil, cyclohexanone, diacetyllauroyl glycerol, dibutyl adipate, diethyl L-tartrate, diethyl malate, diethyl malonate, diethyl oxalate, diethyl phthalate, diethyl succinate, dimethyl carbonate, N,N-dimethylformamide, N,N-dimethylformamide: Water (1:1), dimethyl maleate, dimethyl malonate, dimethyl sulfoxide, dimethyl sulfoxide, dimethyl sulfoxide:water (1:1), 1,3-dioxolane, 1,3-dioxolane:water (1:1), ethanol, ethanol:water (1:1), ethyl linoleate, ethylene carbonate, ethylene glycol diacetate, extra virgin olive oil, flaxseed oil, glycerol, isopropyl alcohol, isopropyl alcohol:water (1:1), mineral oil, poly(ethylene glycol) butyl ether mol. wt. 206, poly(propylene glycol) mol. wt. 425, polycaprolactone triol mol. wt. 300, polydimethylsiloxane mol. wt. 360, polyethylene glycol mol. wt. 300), 1-propanol, 1-propanol:Water (1:1), and sunflower oil.

The USI devices were also made using were also made with dyes such as alizarin, 3',6'-bis(diethylamino)-2-(4-nitrophenyl)spiro[isoindole-1,9'-xanthene]-3-one, 2'-anilino-6'-(dipentylamino)-3'-methylspiro[2-benzofuran-3,9'-xanthene]-1-one, bromocresol purple, bromothymol blue, 2'-(2-chloroanilino)-6'-(dibutylamino)fluoran, 2'-(dibenzylamino)-6'-(diethylamino)fluoran, 6'-diethylamino)-1',2'-benzofluoran, 6'-(diethylamino)-1',3'-dimethylfluoran, 3',6'-dimethyoxyfluoran, indigo, leuco crystal violet, leuco malachite green, malachite green carbinol base, nigrosin alcohol soluble, pentamethoxy triphenylmethanol, 2'-anilino-6'-[ethyl(3-methylbutyl)amino]-3'-methylspiro[isobenzofuran-1(3H),9'-[9H]xanthene]-3-one.

The USI devices were also made using chloro compounds such as 1-chloro-1-nitropropane, chloroform, carbon tetrachloride, chlorinated paraffins, chloroacetic acid, ethyl trichloroacetate, 1,1,1,2,2,3,3-Heptachloropropane, 1,1,1,2,2,3,3-Heptafluoro-3-methoxypropanol, hexachloroacetone, methyl trichloroacetate, 1,1,1,3-tetrachloropropane, trichloroacetamide, trichloroacetic acid, 1,1,1-trichloroethane, 1,1,1-trichloropropane, 2,2,2-trichloroethanol, 2,2,2-trichloromethylphenyl carbinyl acetate, 1,1,1-trichloro-2-methyl-2-propanol hemihydrate and alpha-(trichloromethyl)benzyl acetate, polyvinyl chloride, polyvinylidene chloride, polyepichlorhydrin and halogenated polymers, such as chlorinated polyisoprene and chlorinated polyvinylchloride.

The USI devices were made using iodo compounds such as 1-iodoheptane, 1-iodohexane, 1-iodononane, 1-iodopentane, carbon tetraiodide, 1-chloro-3-iodopropane, 1,4-diiodobutane, 1,6-diiodohexane, 1,3-diiodopropane, diiodomethane, 1-iodododecane, iodoethane, and iodoform. A piece of copper thin foil or wire was used a stabilizer with these iodo compounds.

Stabilizers used for halo compounds includes polyethylene glycol diglycidyl ether, glycidol, amylene, ethyl sorbate, ethyl linoleate, methanol, ethanol, glycerol, methyl hydroquinone, thymol, menthol, 4-methoxy phenol and dibutyhydroxytoluene (BHT).

The following Examples are illustrative of carrying out the invention and should not be construed as being limits on the scope and spirit of the instant invention.

EXAMPLES

Example 1: Ultrasonicators

The following ultrasonicators were used for testing the USI devices: (i) A DK SONIC (made in China) ultrasonic cleaner, model number DK-3000H, 30 Liter capacity, (ii) VEVOR (made in China) ultra cleaner model number JPS-20A, 3.2 liter capacity, (iii) BRANSON (Danbury, CT, USA) Bransonic 1200 ultrasonic cleaner, model #B1200R-4, and (iv) FISHER (Waltham, MA, USA) Sonic Dismembrator (Model 300).

Example 2: Shakers

In order to determine vibrational stability of USI devices during shipment, selected USI formulations were shaken on (i) Atomix type 50800 by Thermodyne (Dubuque, Iowa, USA) and/or (ii) Orbital Shaker, CO-Z, (China) from minutes to hours to visually note any change in clarity or color. Most of the USI formulations were unaffected (no color change or clarity) by the vigorous shaking.

Example 3: Shelf Life and Stability Determination

In order to determine environmental stability of USI formulations during storage and shipment selected USI formulations before and after ultrasonication were placed in a freezer at ~−10° C. and also in an oven at ~50° C. for one or more days. The samples were brought out to see if they did not undergo any color or clarity change.

Example 4: Containers Used

A wide variety of containers from test tubes to crimped glass vials were used to make USI device samples. The following plastic containers were used more frequently: 2ml polypropylene centrifuge tubes with snap caps and 2 ml glass vial with 5-10 1 mm glass beads or 5 ml glass vial with 12 mm glass marble with screw caps.

Example 5: General Method of Making Usi Formulation and the Device

In a 10 ml test tube, a few particles or know weight, such as 0.01 g of a pH dye or leuco/fluoran dye were dissolved in 5 ml of organic solvent, such as diethyl phthlate. 1 ml of the dye solution was taken in 2 ml glass vial or 1.5 ml polypropylene centrifuge tube with about five 1 mm glass beads. 1-10 drops of chloroform were added from 1 ml plastic pipette in the centrifuge tube or glass vial and closed to form USI devices. The USI devices were placed into a degassed ultrasonicator bath and ultrasonicated for a varied amount of time from 1-30 minutes. Any color change was noted or photographed.

Example 6: USI Formulation With a Leuco Dye as an Indicator

In a 1.5 ml polypropylene centrifuge tube was added 1 ml of diethyl phthalate, 3 drops of chloroform and 0.05 g of leuco dyes, for example leuco crystal violet and closed to form a USI device. The mixture was shaken to dissolve the dye. The USI device was placed in DK SONIC ultrasonic cleaner, model number DK-3000H filled with 30 Liter of water. The USI device was floating in the bath. The USI device was ultrasonicated for a varied amount of time from 1 to 5 minutes. The USI formulation developed a blue color upon the sonication. The color development was not very uniform, so, the centrifuge was shaken a few times after taking out of the bath. The color change was noted/photographed. The USI formulation with leuco crystal violet developed a noticeable blue color at one minute of sonication and a dark blue color at 5 minutes of sonication.

The above experiments were repeated with varied amount of the dye and chloroform, with and without glass beads. The color change was faster with higher concentrations of the dye and chloroform. The color change was faster when glass beads were used.

Example 7: USI Device Using 2 ml Glass Vial

The above experiments were also repeated using 2 ml glass vial with seven 1 mm glass beads as agitation aids and then was closed with a screw cap to form the USI device. The USI device sank the bottom of the bath. The USI device was sonicated for 1 to 5 minutes. The formulation developed a blue depending the sonication time. The experiments were repeated with a rubber septum and crimped aluminum cap.

Example 8: USI Device Using 5 ml Glass Vial

The above experiments were also repeated using 5 ml glass vial with one 12 mm glass marble as an agitation aid and then was closed with a screw cap to form the USI device. The USI device sank the bottom of the bath. The USI device was sonicated for 1 to 5 minutes. The USI formulation developed a blue depending the sonication time.

The invention has been described with reference to preferred embodiments without limit thereto. One of skill in the art would realize additional embodiments which are described and set forth in the claims appended hereto.

The invention claimed is:

1. An USI device comprising:

a container comprising an USI formulation comprising:

an organic liquid;

a pH dye; and an activator, wherein said activator produces an acid upon ultrasonification; and wherein said formulation changes color upon ultrasonification but not upon mechanical shaking.

2. The USI device of claim 1, wherein said USI formulation has a turbidity of no more than 100 FTU.

3. The USI device of claim 2, wherein said turbidity is no more than 50 FTU.

4. The USI device of claim 3, wherein said turbidity is no more than 20 FTU.

5. The USI device of claim 1, wherein said USI formulation comprises less than 20 wt % water.

6. The USI device of claim 5, wherein said USI formulation comprises less than 5 wt % water.

7. The USI device of claim 6, wherein said USI formulation comprises less than 1 wt % water.

8. The USI device of claim 7, wherein said USI formulation comprises less than 0.5 wt % water.

9. The USI device of claim 1, wherein said USI formulation comprises 0.01-50 wt % of said activator; 10-99 wt % of said organic liquid and 0.001 to 10 wt % of said pH dye.

10. The USI device of claim 9, wherein said USI formulation comprises 1-10 wt % of said activator.

11. The USI device of claim 9, wherein said USI formulation comprises 30-80 wt % of said organic liquid.

12. The USI device of claim 9, wherein said USI formulation comprises 0.1-5 wt % of said pH dye.

13. The USI device of claim 1, wherein said USI formulation further comprises an additive.

14. The USI device of claim 13, wherein said USI formulation comprises 0.01-50 wt % of said additive.

15. The USI device of claim 14, wherein said USI formulation comprises 1-10 wt % of said additive.

16. The USI device of claim 1, wherein said organic liquid is selected from the group consisting of substituted or unsubstituted aliphatic or aromatic amides, alcohols, esters, nitroalkanes, aldehydes, carbonates, aromatic alcohols, amines, ether-esters, alcohol-esters, acids, ketones, ketone-esters, and lactones.

17. The USI device of claim 16, wherein said organic liquid is selected from the group consisting of acetamide, dimethylformamide, chloroacetamide, amyl alcohol, hexyl alcohol, dichloropropanol, methylpropionate, amylformate, diethyl maleate, ethylene glycol diacetate, ethylsalicylate, triacetin, nitropropane, butyraldehyde, diethylcarbonate, propylene carbonate, dihydroxy benzene, benzyl alcohol, phenol, diethanolamine, dimethylpyridine, cyclohexane diamine, ethoxyethylacetate, trioxane, tetraethylene glycol dimethylether, benzyl ether, phenylether, propylene glycol ethylether acetate, propylene glycol butylether, ethylene glycol monoacetate, glutaric acid, isobutyric acid, mandelic acid, toluene sulfonic acid, methylethylketone, hydroxyacetophenone, methylacetoacetate, propiolactone, butyrolactone, methylpyrrolidone, 4-(benzyloxy)phenol, bis(2-ethylhexyl)adipate, bis(2-ethylhexyl) sebacate, cyclopentanone, dibutyl adipate, dibutyl diacetate, diethyl malate, diethyl malonate, diethyl oxalate, diethyl phthalate, diethyl succinate, diethyl 1-tartrate, dimethyl carbonate, dimethyl maleate, dimethyl malonate, dimethyl phthalate, dioctyl phthalate, ethylene carbonate, ethylene glycol diacetate, candelilia wax, bees wax, paraffin wax, paraffin wax, benzyl n-butyl phthalate, dibutyl phthalate, triethyl phosphate, triphenyl phosphate, tris(2-butoxy ethanol)phosphate, tris(2-chloroethyl)phosphate, acetonitrile, 1-butoxy-2-propanol, 1,4-dioxane, 1,3-dioxolane, ethanol, 2-ethoxyethanol, glycerin, ethylene glycol mono-butyl ether acetate, isopropanol, methanol, 1-methoxy-2-propanol, and nitromethane.

18. The USI device of claim 1, wherein said organic liquid is selected from the group consists of 2-butoxyethanol, 2-cyclohexen-1-one, almond oil, avocado, benzyl ether, bis (2-ethylhexyl) adipate, Bis (2-ethylhexyl) sebacate, canola oil, castor oil, corn oil, cottonseed oil, cyclohexanone, diacetyllauroyl glycerol, dibutyl adipate, diethyl L-tartrate, diethyl malate, diethyl malonate, diethyl oxalate, diethyl phthalate, diethyl succinate, dimethyl carbonate, N,N-dimethylformamide, N,N-dimethylformamide: Water (1:1), dimethyl maleate, dimethyl malonate, dimethyl sulfoxide, dimethyl sulfoxide, dimethyl sulfoxide: water (1:1), 1,3-dioxolane, 1,3-dioxolane: water (1:1), ethanol, ethanol: water (1:1), ethyl linoleate, ethylene carbonate, ethylene glycol diacetate, extra virgin olive oil, flaxseed oil, glycerol, isopropyl alcohol, isopropyl alcohol: water (1:1), mineral oil, poly (ethylene glycol) butyl ether mol.wt. 206, poly (propylene glycol) mol.wt. 425, polycaprolactone triol mol.wt. 300, polydimethylsiloxane mol.wt. 360, polyethylene glycol mol.wt. 300), 1-propanol, 1-propanol: Water (1:1), and sunflower oil.

19. The USI device of claim 1, wherein said organic liquid is selected from the group consisting of polyethylene glycol, polypropylene glycol, polybutadiene, polycaprolactone, poly [di(ethylene glycol) phthalate, poly (dimethylsiloxane), polyurethane, and their copolymers of repeat unit 2 to 100.

20. The USI device of claim 1, wherein said pH dye is selected from the group consisting of acid alizarin violet N, acid blue 89, acid blue 92, acid fuchsin, acridine, alizarin red, alizarin red S, alizarin yellow GG, alizarin yellow R, alkali blue, 9-amino-6-chloro-2-methoxyacridine, 5-aminosalicylic acid, anilinesulfonephthalein, anthranilic acid, aurin, benzaurin, benzopurpurin 4B, brilliant green, brilliant yellow, bromochlorophenol blue, bromochlorophenol blue-sodium salt, bromocresol green, bromocresol green sodium salt, bromocresol purple, bromocresol purple sodium salt, bromophenol blue, bromophenol blue sodium salt, bromophenol red, bromothymol blue, bromothymol blue sodium salt, bromoxylenol blue, calcein, calmagite, carbazol yellow, 5-carboxyfluorescein, 6-carboxyfluorescein, 5-carboxyfluorescein diacetate, 6-carboxyfluorescein diacetate, 5(6)-carboxyfluorescein diacetate succinimidyl ester, 5-carboxynaphthofluorescein, 6-carboxynaphthofluorescein, 5-carboxynaphthofluorescein diacetate, carboxy snafl 1, carboxy snafl 2, carvacrolphthalein, chlorophenol red, chlorophenol red-sodium salt, chrome orange GR, chrysoidin, clayton yellow, Congo red, coumarin, o-cresolbenzein, o-cresolphthalein, o-cresolphthalein complexon, m-cresol purple, m-cresol purple-sodium salt, o-cresol red, o-cresol red-sodium salt, crystal violet, curcumin, dichlorofluorescein, 6,7-dihydroxycoumarin, 3,6-dihydroxyphthalimide, 4-dimethylamino-2-methylazobenzene, dinitrocresol, alpha-dinitrophenol, beta-dinitrophenol, gamma-dinitrophenol, epsilon-dinitrophenol, delta-dinitrophenol, 2,4-dinitrophenylhydrazine, dinitrothymol, direct blue 72, dixylenolphthalein, eosin Y, erythrosin B, esculetin, ethyl-bis (2,4-dinitrophenyl)-acetate, ethyl green, ethyl orange, ethyl red, ethyl violet, fluorescein, fluorescein diacetate, fluorescein disodium salt, fluorescein-5-isothiocyanate, fluorexon, gallein, gentian violet, gentian violet B, guaiacolphthalein, harmine, hematoxylin, 4-heptadecyl-7-hydroxycoumarin, heptamethoxy red, hexamethoxy red, o-hydroxypheylbenzimidazole, o- hydroxypheylbenzothiazole, o-hydroxypheylbenzoxazole, indigo carmine, indophenol, iodophenol blue, isonitrosothiocamphor, isopicramic acid, lacmoid, lanacyl violet BF,luminol, lysosensor blue DND 167, lysosensor blue DND 192, lysosensor green DND 189, lysosensor yellow/blue DND 160, magdala red, malachite green, martius yellow, mesalamine, Metanil yellow, 2-methoxybenzaldehyde, 4-methylesculetin, methyl green, methyl orange, methyl purple, methyl red, methyl red sodium salt, 4-methylumbelliferone, methyl violet, methyl yellow, alpha-naphthoic acid, beta-naphthol, naphthol AS, alpha-naphtholbenzein, alpha-naphtholphthalein, alpha-naphthylamine, beta-naphthylamine, alpha-naphthyl red, neutral red, Nile blue, nitramine, nitrazine yellow, p-nitrobenzhydrazide, p-nitrobenzylcyanide, 4-nitrocatechol, o-nitrophenol, m-nitrophenol, p-nitrophenol, orange II, orange III, orange IV, Oregon green 488 carboxylic acid, Oregon green 514 carboxylic acid, Oregon green 488 carboxylic acid diacetate, patent blue V, pentamethoxy red, phenolbenzein, phenolmalein, phenolphthalein, phenolphthalein disodium salt, phenol red, phenol red sodium salt, 4-(phenylazo)-diphenylamine, o-phenylenediamine, p-phenylenediamine, phloxine B, picric acid, pinachrome, poirrier blue, propyl red, pyrogallolphthalein, quinaldine red, quinine, quininic acid, quinoline blue, resazurin, resorcein, resorcinmalein, resorufin, rhodol green, p-rosolic acid, rubrophen, salicyladehyde semicarbazone, salicylic acid, salicyl yellow, solochrome violet RS, sulphan blue, tetrabromophenol blue, tetrabromophenol blue sodium salt, tetrabromophenolphthalein, tetraiodophenolsulfonephthalein, tetryl, thiazol yellow G, thymolbenzein, thymol blue, thymolphthalein, trinitrobenzene, trinitrobenzoic acid, trinitrotoluene, tropaeolin O, tropaeolin OO, tropaeolin OOO, umbelliferone, xylenol blue, xylenol orange, and xylenolphthalein.

21. The USI device of claim 20, wherein said wherein said pH dye is a leuco dye.

22. The USI device of claim 21, wherein said leuco dye is selected from the group consisting of leuco crystal violet, rose Bengal lactone, malachite green carbinol base, leuco malachite green, pararosaniline base, methyl violet B base, acridine orange base, leucoquinizarin, and a leuco fluoran dye.

23. The USI device of claim 1, wherein said pH dye is selected from the group consisting of leuco crystal violet, alizarin, 3',6'-bis (diethylamino)-2-(4-nitrophenyl)spiro [isoindole-1,9'-xanthene]-3-one, 2'-anilino-6'-(dipentylamino)-3'-methylspiro [2-benzofuran-3,9'-xanthene]-1-one, bromocresol purple, bromothymol blue, 2'-(2-chloroanilino)-6'-(dibutylamino) fluoran, 2'-(dibenzylamino)-6'-(diethylamino) fluoran, 6'-diethylamino)-1',2'-benzofluoran, 6'-(diethylamino)-1',3'-dimethylfluoran, 3',6'-dimethyoxyfluoran, indigo, leuco crystal violet, leuco malachite green, malachite green carbinol base, nigrosin alcohol soluble, pentamethoxy triphenylmethanol, and 2'-anilino-6'-[ethyl(3-methylbutyl)amino]-3'-methylspiro [isobenzofuran-1 (3H),9'-[9H] xanthene]-3-one.

24. The USI device of claim 1, wherein said activator is selected from one of a halo compound and a nitro compound.

25. The USI device of claim 24, wherein said halo compound is selected from the group consisting of chlorocarbon, bromocarbon, iodocarbon, and mixed halocarbon compounds.

26. The USI device of claim 25, wherein said halo compound is a monochlorocarbon, dichlorocarbon, or trihalocarbon.

27. The USI device of claim 24, wherein said halo compound is selected from the group consisting of 1-chloro-1-nitropropane, chloroform, carbon tetrachloride, chloroacetic acid, chloropropionic acid, ethyl trichloroacetate, heptachloropropane, hexachlorocyclohexane, methyl trichloroacetimidate, pentachloroethane, tetrachloroethane, trichloroethanol, trichloromethyl benzyl acetate, trichloromethyl propanol hydrate, trichloropropane, trichloroacetamide, trichloroacetic acid, trichloroethaneisocyante, trichloromethylbenzylacetate, trichloromethylpropanol, trichloropropane, chlorinated paraffins, halo polymers, polyvinyl chloride, polyvinylidene chloride, polyepichlorhydrin and halogenated polymers, chlorinated polyisoprene, and chlorinated polyvinylchloride.

28. The USI device of claim 1, wherein said halo compound is selected from the group consisting of chloroform, 1-chloro-1-nitropropane, carbon tetrachloride, chlorinated paraffins, chloroacetic acid, ethyl trichloroacetate, 1,1,1,2,2,3,3-Heptachloropropane, 1,1,1,2,2,3,3-Heptafluoro-3-methoxypropanol, hexachloroacetone, methyl trichloroacetate, 1,1,1,3-tetrachloropropane, trichloroacetamide, trichloroacetic acid, 1,1,1-trichloroethane, 1,1,1-trichloropropane, 2,2,2-trichloroethanol, 2,2,2-trichloromethylphenyl carbinyl acetate, 1,1,1-trichloro-2-methyl-2-propanol hemihydrate and alpha-(trichloromethyl) benzyl acetate, polyvinyl chloride, polyvinylidene chloride, polyepichlorhydrin and halogenated polymers, chlorinated polyisoprene, chlorinated polyvinylchloride, 1-iodoheptane, 1-iodohexane, 1-iodononane, 1-iodopentane, carbon tetraiodide, 1-chloro-3-iodopropane, 1,4-diiodobutane, 1,6-diiodohexane, 1,3-diiodopropane, diiodomethane, 1-iododecane, iodoethane, and iodoform.

29. The USI device of claim 24, wherein said halo compound is selected from the group consisting of 1,1-bis [p-chlorophenyl]-2,2,2-trichloroethane, 1,1-bis [p-methoxyphenyl]-2,2,2-trichloroethane, 1,2,5,6,9,10-hexabromo cyclododecane, 1,10-dibromodecane, 1,1-bis [p-chlorophenyl]-2,2-dichloroethane, 4,4'-dichloro-2-(trichloromethyl) benzhydrol, hexachlorodimethyl sulfone, 2-chloro-6 (trichloromethyl) pyridine, 0,0-diethyl-0-(3,5,6-trichloro-2-pyridyl) phosphorothionate, 1,2,3,4,5,6-hexachloro cyclohexane, N(1,1-bis [p-chlorophenyl]-2,2,2-trichloroethyl) acetamide, tris[2,3-dibromopropyl]isocyanurate, 2,2-bis [p-chlorophenyl]-1,1-dichloroethylene, tris [trichloromethyl] s-triazine, chloroform, dichloroethane, ethyl trichloroacetate, hexachloroacetone, trichloroaetamide, 1,1,1-trichloroethane, trichloromethylphenyl carbinyl acetate, and tris (2-chloroethyl) phosphate, and their isomers, analogs, and homologs.

30. The USI device of claim 24, wherein said halo compound is a polymeric halo compound.

31. The USI device of claim 30, wherein said polymeric halo compound is selected from the group consisting of polyvinyl chloride, polyvinylidene chloride, chlorinated rubber, and their copolymers.

32. The USI device of claim 24, wherein said nitro compound is selected from the group consisting of substituted and unsubstituted aliphatic, aromatic and cyclic nitro compounds, inorganic nitrates, and inorganic nitrite.

33. The USI device of claim 32, wherein said nitro compound is selected from the group consisting of nitrophenols, nitrotoluenes, nitronaphthalenes, nitroanisidines, nitrobenzenes, chloronitrobenzenes, amyl nitrite, chloronitropropane, diethylene glycol nitrates, ethylene glycol nitrates, ethyl nitrate, nitroglycerins, nitroso-compounds, nitrocellulose, sodium nitrate, ammonium nitrate, and sodium nitrite.

34. The USI device of claim 24, wherein said nitro compound is selected from the group consisting of 2,2'-azodiisobutyronitrile, 3,5-dinitrobenzoic acid, dinitronaphthalene, 1,8-dinitronaphthalene, 3,5-dinitrobenzoic acid, 2,4-dinitro-1-naphthol, disodium 1-nitroso-2-naphthol-3,6-disulfonate, 4-hydroxy-3-nitroso-1-naphthalene sulfonic acid, 4-nitrobenzoic acid, 5-nitroguaiacol, 4-nitrophenol, 4-nitrosophenol, sodium salt, 1-nitroso-2-naphthol, 2-nitroso-1-naphthol, 4-nitrosophenol, 4-nitrotoluene, ammonium nitrate, sodium nitrate, and sodium nitrite.

35. The USI device of claim 1, wherein said USI formulation further comprises an inorganic compound.

36. The USI device of claim 35 comprising up to 5 wt % of said inorganic compound.

37. The USI device of claim 35, wherein said inorganic compound is selected from the group consisting of ammonium acetate, ammonium bromide, ammonium carbamate, ammonium carbonate, ammonium chloride, ammonium dihydrogen phosphate, ammonium ferrocyanide (II) hydrate, ammonium iron (IIII) citrate, ammonium iron (III) oxylate hydrate, ammonium iron (III) sulfate dodecahydrate, ammonium iron (III) sulfate hexahydrate, ammonium sulfate, ammonium sulfite monohydrate, ammonium thiocyanate, ammonium thiosulfate, alumina, aluminum acetylacetonate, aluminum ammonium sulfate dodecahydrate, aluminum chloride hexahydrate, aluminum hydroxide, aluminum nitrate nonahydrate, aluminum sulfate hexadecahydrate, aluminum sulfate octadecahydrate, benzeneboronic acid, borane-tert-butylamine, borane dimethylamine, boric acid, boric acid tri-n-butyl ester, calcium acetate monohydrate, calcium acetyl acetonate hydrate, calcium bromide anhydrous, calcium bromide monohydrate, calcium chloride, calcium ferrocyanide, calcium hydroxide, calcium orthophosphate, calcium sulfide, copper, copper (II) acetate monohydrate, copper (II) acetylacetonate hydrate, copper (II) bromide, copper (I) chloride, copper (II) chloride hydrate, copper pyrophosphate, copper (II) sulfate pentahydrate, copper (I) thiocyanate, cupric benzoate, lithium acetylacetonate, lithium tetra-borate, lithium chloride, lithium formate monohydrate, lithium hydroxide monohydrate, ferric acetylacetonate, iron (II) bromide, iron (II) chloride tetrahydrate, iron (III) chloride hexahydrate, ferric ferrocyanide, ferrocene, p-gluconic acid, iron (II) salt dihydrate, ferric salicylate, iron (II) sulfate heptahydrate, iron (III) sulfate pentahydrate, magnesium acetate tetrahydrate, magnesium chloride hexahydrate, magnesium oxide, magnesium sulfate heptahydrate, nickel, nickel (III) bromide, nickel (II) chloride, nickel sulfate, potassium acetate, potassium benzoate, potassium bromide, potassium carbonate, potassium chloride, potassium ferrocyanide (II) trihydrate, potassium ferricyanide, potassium formate, potassium iodide, potassium nitrate, potassium phosphate, dibasic trihydrate, tripotassium phosphate, potassium pyrophosphate, potassium sodium tartrate tetrahydrate, sodium acetate, sodium acetylacetonate, sodium bromide, sodium carbonate, sodium chloride, sodium cyanate, sodium dihydrogen phosphate, sodium diethyldithiocarbamate trihydrate, sodium fluoroborate, sodium hexametaphosphate, sodium iodide, sodium metasilicate, sodium nitrate, sodium nitrite, sodium oxalate, sodium thiosulfate pentahydrate, sodium phosphate, dibasic, sodium sulfate anhydrous, sodium sulfite anhydrous, sodium tetraborate, sodium thiocyanate, sodium trimetaphosphate, sodium tripolyphosphate, tin (II) bromide, tin (II) 2-ethylhexanoate, zinc acetate dihydrate, zinc acetylacetonate hydrate, zinc bromide, zinc chloride, zinc iodide, zinc sulfate heptahydrate, zinc sulfide, and 3-chlorophenylboronic acid.

38. The USI device of claim 1, wherein said USI formulation further comprises an organic compound.

39. The USI device of claim 38 comprising up to 5 wt % of said organic compound.

40. The USI device of claim 38, wherein said organic compounds is selected from the group consisting of 4-acetamidophenol, acetone oxime, 2-amino-p-cresol, 4-tert-amylphenol, ascorbic acid, azodicarbonamide, benzilic acid, 2-(2h-benzotriazol-2-yl) -6-dodecyl-4-methylphenol, benzotriazole, benzenesulfonic acid, benzyl sulfoxide, 2-benzoylbenzoic acid, 4,4-bis (4-hydroxyphenyl)-valeric acid, tert-butylhydroquinone, caffeine, trans-cinnamic acid, 2,6-di-tert-butyl-4-methylphenol, 2,7-dihydroxynaphthalene, 4,5-dihydroxy-2,7-naphthalenedisulfonic acid, 4,5-dihydroxy-2,7-naphthalenedisulfonic acid disodium salt, 6,7-dihydroxy-2-naphthalenesulfonic acid, sodium salt hemihydrate, dimethylglyoxime, diphenylamine, 4-diazodiphenylamine sulfate, diazoaminobenzene, dinitronaphthalene, 1,8-dinitronaphthalene, 2,4-dinitrodiphenylamine, ethylenediaminetetraacetic acid, ethylenediaminetetraacetic acid iron (iii) sodium salt hydrate, ethyl gallate, gallic acid monohydrate, gallic acid stearyl ester, gluconic acid, sodium salt 97 wt % (sodium gluconate), 8-gluconolactone, glycerophosphate (calcium salt), 2-hydroxycinnamic acid, 4-hydroxycoumarin, 2-hydroxy-4-methoxybenzophenone7-hydroxy-4-methyl coumarin, 2-hydroxy-1,4-naphthalene, hydroquinonesulfonic acid potassium salt, lauryl gallate, dl-malic acid, mandelic acid, methylhydroquinone, methyl 3,4,5-trihydroxy-benzoate, 5-nitroguaiacol, octadecylamine, 1,10 phenanthroline, phenothiazine, phenylboronic acid, n-phenyl-2-naphthylamine, 4-phenylphenol, phytic acid 50 wt % solution in water, poly(ethylene glycol)dimethyl ether mn~500, propylgallate, pyrogallic acid, salicylic acid, salicylamide, salicylaldoxime, tetrabutyl ammonium hydrogen sulfate, tetrabutylphosphonium bromide, tannoform, tetra-n-hexylammoinium bromide, tetrahexylammonium bromide, p-toluenesulfonic acid monohydrate, trichloroacetamide, trimethylhydroquinone, 2,3,4-trihydroxybenzophenone, trichloromethylphenyl carbinyl acetate, triethanolamine borate, 2,2',4,4'-tetrahydroxy-benzophenone, tris (hydroxymethyl)aminomethane, 1,1,1-tris(4-hydroxyphenyl) ethane, resorcinol, rutin hydrate, trans-stilbene, urea, glyoxal trimeric dihydrate, 2-diazo-1-naphthol-5-sulfonic acid sodium salt monohydrate, 1-diazo-2-naphthol-4-sulfonic acid, fast blue base B, fast orange base GC, fast red base B, fast scarlet base G, 4-hydroxy-3-nitrobenzoic acid, 4-nitrocinnamic acid, 2'2-biphenol, citric acid, 1,12-diaminododecane, 4-diazo-3-methoxydiphenylamine sulfate, 4,5-dihydroxy-1,3-benzene disulfonic acid disodium salt hemihydrate, 1,6-dihydroxy naphthalene, 3,6-dihydroxy naphthalene-2,7-disulfonic acid disodium salt, ethylenediaminetetraacetic acid tetrasodium salt dihydrate, magnesium stearate, 4-4'oxydibenzenesulfonyl hydrazide, tetrabutylammonium bromide, 2-acetylphenothiazine, ascorbic acid 6-palmitate, and benzamide.

41. The USI device of claim 1, wherein said USI formulation has a pH of 4 to 10.

42. The USI device of claim 41, wherein said pH is 5 to 9.

43. The USI device of claim 42, wherein said pH is 6 to 8.

44. The USI device of claim 1, wherein said USI formulation further comprises a UV absorber.

45. The USI device of claim 44, wherein said UV absorber is selected from the group consisting of benzamide, benzophenone hydrazone, 3,3',4,4' benzophenone tetracarboxylicdianhydride, benzotriazole, 2,2' biphenol, 4,4' biphenol, bisphenol A, 2-(2H-benzotriazole-2-yl-4-methyl phenol), coumarin, ethylhexyl p-methoxycinnamate, 2-ethylhexyl salicylate, oxybenzone, p-aminobenzoic acid its derivatives, diester and/or polyester of a naphthalene dicarboxylic acid, cinnamates (octylmethoxycinnamate and cinoxate), salicylates (methyl salicylate), anthranilates, menthyl anthranilate, 2-ethylhexyl-2-cyano-3,3-diphenyl acrylate, 2-phenyl benzimidazole-5-sulfonic acid, digalloyltrioleate, 3-(4-methyl benzylidene) camphor, 4-isopropyl dibenzoyl methane, butyl methoxydibenzoyl methane, 2-ethyl-2-cyano-3,3'-diphenyl acrylate, cupferron, ethylsalicylate, hydroxymethoxy benzophenone, hydroxybenzophenone, hydroxycinnamic acid, sulfosalicylic acid, tetrahydroxy benzophenone, fluorescin, fast blue BB, phenothiazine, 4-nitrophenol, 7-hydroxy-4-methylcoumarin, 2-(2H-benzotriazol-2-yl)-4-(1,1,3,3-tetramethylbutyl)phenol, 2-(2H-benzotriazol-2-yl)-4,6-di-tert-pentylphenol, poly[2-(4-benzoyl-3-hydroxyphenoxy)ethyl acrylate], 2-tert-butyl-6-(5-chloro-2H-benzotriazol-2-yl)4-methylphenol, 2-(2H-benzotriazol-2-yl)-4,6-bis(l-methyl-1-phenylethyl)phenol, 2,2-methylenebis[6-(2H-benzotriazol-2-yl)-4-(1,1,3,3-tetramethylbutyl)phenol], 2-(2 H-benzotriazol-2-yl)-6-dodecyl-4-methylphenol, 2-phenyl-5-benzimidazolesulfonic acid, 2-(2'-hydroxy-5-octylphenyl benzotriazole), 3,4 diaminobenzophenone, 2,4 dihydroxybenzophenone, 3,5 dihydroxy benzoic acid, 2,2' dihydroxy 4,4' dimethyl benzophenone, 2,2' dihydroxy 4 methoxy benzophenone, 2,3 dihydroxy naphthalene, diphenylamine, di-tert-butyl-4-methyl phenol, 4-hydroxybenzophenone, 2-hydroxy-4-methoxy benzophenone, 2-hydroxy -4n-octyloxybenzophenone, lauryl gallate, phenyl hydroquinone, 4,4'(1,4 phenylenediisopropylidine) bisphenol, 4,4'(1,3 phenylenediisopropylidine) bisphenol, salicylanilide, 2,2',4,4'tetrahydroxy benzophenone, 2,3,4 trihydroxybenzophenone, trimethyl hydroquinone, and 1,1,1tris(4-hydroxyphenyl) ethane, aromatic polymers, polystyrene, polyethylene terephthalate, aromatic polyurethanes, and poly(bis-phenol carbonate).

46. The USI device of claim 1, wherein said USI formulation further comprises a stabilizer.

47. The USI device of claim 46, wherein said stabilizer is selected from the group consisting of an epoxide, an unsaturated compound, an alcohol, and an alkyl phenol.

48. The USI device of claim 47, wherein said stabilizer is selected from the group consisting of polyethylene glycol, diglycidyl ether, glycidol, propylene oxide, ethylene oxide, amylene, ethyl sorbate, ethyl linoleate, linseed oil, methanol, ethanol, glycerol and glucose, methyl hydroquinone, thymol, menthol, 4-methoxy phenol, and dibutyhydroxytoluene (BHT).

49. The USI device of claim 1, wherein said USI formulation further comprises an agitation aid.

50. The USI device of claim 49, wherein said agitation aid is selected from the group consisting of glass, mineral, metal, and plastic.

51. The USI device of claim 49, wherein said agitation aid is selected from fibers, springs, rods, capillaries, beads, spheres, powder, and pieces.

52. The USI device of claim 49, wherein said agitation aid is selected from the group consisting of 304 stainless steel woven wire, fine steel wool, stainless steel scrubbing scouring pad sponge, stainless steel microfiber cloth, zirconium beads, glass beads, alumina beads, sand, quartz powder, glass glitter, hollow cylinder glass pieces, white coarse sand, silica gel, white quartz sand, glass seed beads, bugle beads, marine sand, natural white marble, tin oxide, zirconium silicate, and hollow glass beads.

53. The USI device of claim 49, wherein said agitation aid comprises hollow glass beads.

54. The USI device of claim 1, wherein said USI formulation further comprises an accelerator.

55. The USI device of claim 54, wherein said accelerator is an acid.

56. The USI device of claim 55, wherein said acid is selected from a mineral acid, carboxylic acid, phenols, and alkyl alcohols.

57. The USI device of claim 55, wherein said acid is selected from the group consisting of hydrochloric acid, hydrobromic acid, hydroiodic acid, sulfuric acid, nitric acid, phosphoric acid, and acetic acid.

58. The USI device of claim 1, wherein said USI formulation further comprising a thickener.

59. The USI device of claim 58, wherein said thickener is an organic or inorganic, low molecular weight material.

60. The USI device of claim 58, wherein said thickener is selected from the group consisting of fumed silica, polyethylene oxide, and polyethylene glycol.

61. The USI device of claim 1, wherein said container is a closed glass or plastic transparent or translucent container.

62. The USI device of claim 1, wherein said container is cylindrical.

63. The USI device of claim 1, wherein said container comprises at least one of a color label, a barcode label, and a color reference chart.

64. The USI device of claim 1, wherein said container comprises at least one of polyethylene, propylene, polystyrene, polyacrylics, polyester, nylon, polyvinyl, glass, and mixtures thereof.

65. A process for monitoring ultrasonic energy imparted on a system comprising:

the USI device of claim 1 comprising:

a container comprising an USI formulation comprising:

an organic liquid;

a pH dye; and]]

an activator, wherein said activator produces an acid upon ultrasonification, wherein the formulation changes color upon ultrasonification but not upon mechanical shaking; and placing said USI device in said system;

and exposing said system to ultrasonic radiation until said USI formulation changes color.

* * * * *